United States Patent [19]

Igawa et al.

[11] Patent Number: 4,769,152

[45] Date of Patent: Sep. 6, 1988

[54] PROCESS FOR REMOVING ELECTROLYTE

[75] Inventors: Manabu Igawa, Kanagawa; Kiyoyuki Echizenya, Tokyo; Takashi Hayashita, Kanagawa; Manabu Seno, Tokyo, all of Japan

[73] Assignee: Nitto Electric Industrial Co., Ltd., Osaka, Japan

[21] Appl. No.: 10,948

[22] Filed: Feb. 5, 1987

[30] Foreign Application Priority Data

Mar. 12, 1986 [JP] Japan .................................. 61-53870

[51] Int. Cl.$^4$ .......................... B01D 13/00; C02F 1/42
[52] U.S. Cl. ................................................... 210/638
[58] Field of Search ...................... 204/184.2; 210/638

[56] References Cited

U.S. PATENT DOCUMENTS

| | | | |
|---|---|---|---|
| 4,042,496 | 8/1977 | Tsushima et al. | 210/638 |
| 4,116,889 | 9/1978 | Chlanda et al. | 204/182.4 |
| 4,391,680 | 7/1983 | Mani et al. | 210/638 |
| 4,647,380 | 3/1987 | Dasgupta | 210/638 |

Primary Examiner—Ivars Cintins
Attorney, Agent, or Firm—Sughrue, Mion, Zinn, Macpeak and Seas

[57] ABSTRACT

A process for removing electrolyte comprising forming a compartment for dealing with a liquid by juxtaposed arrangement of a first barrier across or through which a cation can be exchanged for hydrogen ion and a second barrier across or through which an anion can be exchanged for hydroxyl ion, forming a passage for acid solution outside the first barrier, forming a passage for alkaline solution outside the second barrier and inserting the liquid containing electrolyte into the compartment.

1 Claim, 2 Drawing Sheets

PROCESS FOR REMOVING ELECTROLYTE

FIELD OF THE INVENTION

The invention relates to a process for removing electrolyte rapidly by means of exchanging cations and anions of electrolyte with hydrogen ions and hydroxide ions respectively.

BACKGROUND OF THE INVENTIONS

The process of using ion-exchange resins for removing electrolyte from an electrolyte solution is generally used because of the reason of convenience for handling. (H. Sato, Membrane 7, 156 (1982)) Further, the desalination process by electrodialysis using ion-exchange membranes is also known. This desalination process is as follows:

A compartment for dealing with water is provided by an arrangement of cation-exchange membranes and anion-exchange membranes. Then, an electrolyte is divided between a first compartment having high ion concentration and a second compartment having low ion concentration by means of providing the water to the compartment and of applying electric field of direct current perpendicular to the membrane. Then, the desalinated water is obtained by means of collecting the water from the second compartment. The desalination process is characterized by high rejection.

The process using ion-exchange resins, however, has the problem that the intermittent regeneration is necessary and that the continuous operation is difficult to carry out.

On the other hand, the desalination process by electrodialysis using ion-exchange membranes also has the problem that gas is produced on electrode, and that the efficiency of desalination decreases due to the decrease of electric current density when the water having low ion concentration is dealt with.

SUMMARY OF THE INVENTION

In view of the problems as described above, the present inventors have made extensive investigation and found that electrolyte can be removed efficiently without changing pH of the water which is dealt with, where cation in electrolyte is exchanged with hydrogen ions through a barrier having cation-exchange capability and simultaneously anion in electrolyte is exchanged with hydroxide ions through a barrier having anion-exchange capability, by means of using a particular process involving the principle of Donnan dialysis-type ion-exchange process.

Therefore, an object of the present invention is to provide a process for removing electrolyte comprising forming a compartment for dealing with a liquid by juxtaposed arrangement of a first barrier across or through which a cation can be exchanged for hydrogen ion and a second barrier across or through which an anion can be exchanged for hydroxyl ion, forming a passage for acid solution outside said first barrier, forming a passage for alkaline solution outside said second barrier and inserting a liquid containing electrolyte into said compartment.

BRIEF DESCRIPTION OF THE ACCOMPANYING DRAWING

FIGS. 1(a) and (b) schematically illustrate the principle of ion transport of the present invention;

DETAILED DESCRIPTION OF THE INVENTION

Figure 1A:
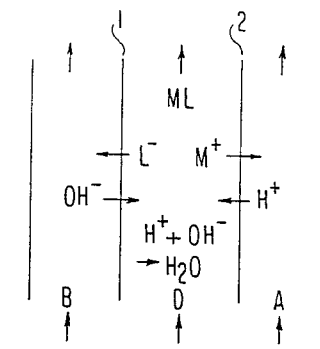

The present invention will be illustrated in detail with reference to the Drawing.

Figure 1B:
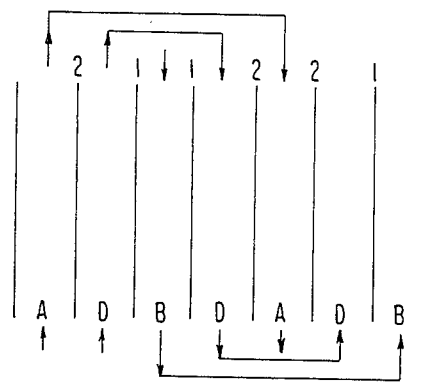

FIG. 1 shows a principle of ion transport of the process for removing electrolyte of the present invention. FIG. 1(a) depicts schematically a cell using one pair of ion-exchange membranes. FIG. 1(b) depicts schematically a cell using three pairs of ion-exchange membranes to increase membrane area three times of that of cell (a).

In FIG. 1, the numeral 1 indicates a barrier across or through which an anion can be exchanged of hydroxyl ion and the numeral 2 indicates a barrier across or through which a cation can be exchanged for hydrogen ion. An alkaline solution such as sodium hydroxide, potassium hydroxide, calcium hydroxide, tetraalkylammonium hydroxide, etc., is provided into a passage B. An acid solution such as hydrochloric acid, nitric acid, sulfuric acid, acetic acid etc., is provided into a passage A. A liquid, which is dealt with, containing electrolyte such as potassium chloride which is expressed by $M^+L^-$, is inserted into a compartment D which is formed by the above ion-exchange membranes. In the process of the present invention, the electrolyte is removed from the liquid rapidly without changing pH of the liquid, because $M^+$ in the electrolyte is ion-exchanged with $H^+$ in the acid solution and $L^-$ in the electrolyte is ion-exchanged with $OH^-$ in the alkaline solution, simultaneously. Further, in the case that the cell having the structure described in FIG. 1(b) is used, the removing rate increases remarkably and the process can be completed in a short time period because of the large membrane surface area. In FIG. 1(b), the designations 1, 2, A, B and D have the same meaning as in FIG. 1(a).

Figure 2:
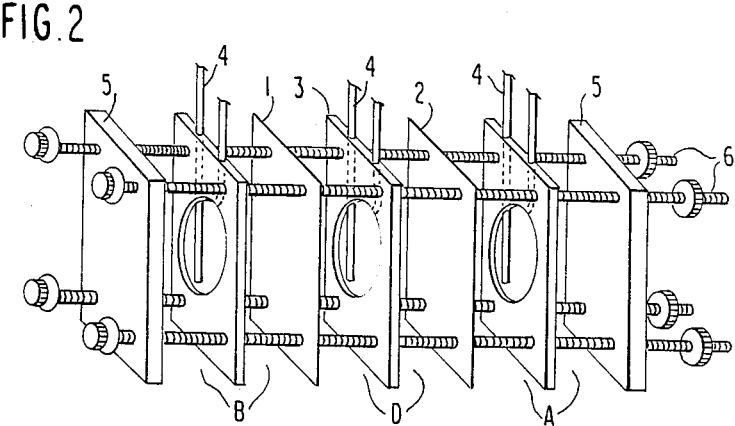
FIG. 2 depicts expanded view of the internal structure of a cell for removing electrolyte.

FIG. 2 depicts expanded view of the internal structure of a cell for removing electrolyte in the present process. In FIG. 2, the designations 1, 2, A, B and D have the same meaning as in FIG. 1(a).

The numeral 3 is a spacer such as silicone rubber, located in the passages A and B and the compartment D, which has a tube 4 made of the material such as a polytetrafluoro ethylene for circulating each solution.

The numeral 5 is a frame made of the materials such as a polypropylene or acrylic resin; a polypropylene is preferably used for durability against chemicals.

The cell is fastened by means of a screw 6 at the time of practical use.

The barrier having ion-exchange capability used in the present invention is not particularly restricted as to usable materials so long as the barrier separates the liquid dealt with from the acid solution or the alkaline solution and the barrier allows or causes the specified ion-exchange through the barrier.

An organic polymer or an inorganic material can be used as the barrier membrane. The configuration of the barrier can be selected voluntarily such as a plate-type or a cylinder-type so long as the barrier has a function as a separation means.

As the barrier having ion-exchange capability, for example, the following can be used:

An ion-exchange membrane comprising a polymer, such as crosslinked polystyrene and polyethylene, with sulfone group, carboxyl group, quaternary ammonium group etc. introduced thereto;

An ion-exchange membrane comprising a symmetric membrane made from a polymer having ion-exchange capability;

A semipermeable membrane having electric charge for reverse osmosis or ultrafiltration, whose surface thin layer is comprised with a polymer having ion-exchange capability such as sulfonated polysulfone;

A liquid membrane prepared by a process comprising dissolving an ion carrier such as crown ether in a hydrophobic solvent such as chloroform and filling the solution in a porous support such as filter paper, polypropylene porous membrane, polytetrafluoroethylene porous membrane, ceramic porous materials, etc.

In view of practical strength, an ion-exchange membrane is preferably used.

As described above, the process according to the present invention can remove electrolyte efficiently without the necessity of intermittent regeneration of resin and changing pH, compared with a process using ion-exchange resin by which electrolyte is removed by absorption, because cations and anions in the liquid are respectively exchanged with hydrogen ions and hydroxide ions simultaneously through the barrier having ion-exchange capability.

Therefore, the process according to the present invention is suitable for an industrial process which requires continuous operation.

Further, compared with an electrodialysis process, the electrolyte is removable efficiently also from a liquid having low electrolyte concentration and gas isn't produced during operation.

Further, the process according to the present invention can be applied to process a liquid such as a tap water (city water) having low electrolyte concentration and a liquid such as soy sauce having high electrolyte concentration.

The present invention will now be illustrated in greater detail by reference to the following examples, but it should be understood that they are not intended to limit the scope of the present invention.

EXAMPLE 1

A potassium chloride solution was dealt with by using a cell for removing electrolyte having the structure described in FIG. 2, using the ion-exchange membranes as the barriers having ion-exchange capability.

The cation-exchange membrane 2 (Selemion CMV, Asahi Glass Company, Ltd.), which has a thickness of 0.11 to 0.15 mm, a water content of 15 to 16% by weight, and an ion-exchange capacity of 1.5 to 1.8 meg/g (dry membrane), and the anion-exchange membrane 1 (Selemion AMV, Asahi Glass Company, Ltd.), which has a thickness of 0.11 to 0.15 mm, a water content of 15 to 16% by weight, and an ion-exchange capacity of 2.0 to 2.3 meg/g (dry membrane), are of the membrane area of 11.3 cm$^2$ respectively.

Figure 3:
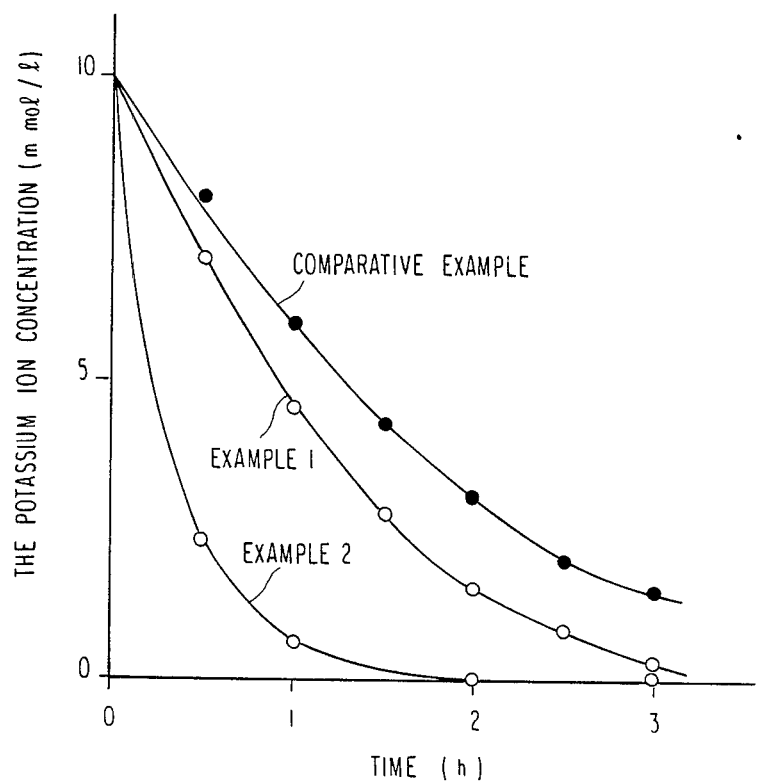
FIG. 3 is a graph based on Example herein.

A 0.1N hydrochloric acid solution (1l) and a 0.1N sodium hydroxide solution (1l) were respectively cycled at 10 ml/min to the passage A and the passage B through a polytetrafluoro ethylene tube. A 10 mmol/l potassium chloride solution as the water dealt with was provided as cycled at 10 ml/min to the compartment D through a poolytetrafluoroethylene tube. This salt solution flowed through compartment D. 2 ml of the solution in the compartment D was collected at 30 minute intervals and the potassium ion concentration was detected with an atomic absorption spectrophotometer, and the changes of the potassium ion concentration with time are indicated in FIG. 3.

The potassium ion concentration decreased with time rapidly and after 3 hours the potassium ion concentration was about 0.2 mmol/l, while the pH of the solution changed little (pH was 4.2).

EXAMPLE 2

The experimentation was done in the same manner as described in Example 1 except using the cell having three pairs of ion-exchange membranes as shown in FIG. 1(b). The total membrane area of the ion-exchange membranes was 33.9 cm$^2$.

The results are shown in FIG. 3. The initial potassium ion concentration in the compartment D was 10 mmol/l. After 3 hours the concentration decreased to about 0.06 ppm, while the pH was 7.0.

COMPARATIVE EXAMPLE

The removing of electrolyte was conducted by using the conventional Donnan dialysis. (F. G. Donnan, Chem. Rev., 1, 73 (1924))

The difference between the present invention and the comparative example was that the cation exchange was conducted by the acid solution using only the cation-exchange membrane. Namely, the experimentation was done in the same manner as described in Example 1 except only using the passage A and the compartment D, and the results are indicated in FIG. 3.

The rate of decrease potassium ion concentration of the compartment D was slower than in Examples 1 and 2, and after 3 hours the pH of the solution of the compartment D decreased to 2.4.

While the invention has been described in detail and with reference to specific embodiments thereof, it will be apparent to one skilled in the art that various changes and modifications can be made therein without departing from the spirit and scope thereof.

What is claimed is:

1. A process for removing electrolyte from a liquid comprising the steps of:
   (1) disposing an array of plural units composed of a plate-type first barrier across which a cation can be exchanged for hydrogen ion and a plate-type second barrier across which an anion can be exchanged for hydroxyl ion, so that within the array, the positionment of the first barrier and the second barrier of each unit is that a first barrier of an internal unit faces the first barrier of another unit and the second barrier of an internal unit faces the second barrier of another unit,
   (2) inserting said liquid containing electrolyte into a compartment formed between the first barrier and the second barrier,
   (3) passing an acid solution through a passage outside the first barrier, and
   (4) passing an alkaline solution through a passage outside the second barrier.

* * * * *